Oct. 6, 1964

D. R. PLUMMER 3,151,486

ACCELEROMETERS

Filed July 17, 1961

INVENTOR.
DEXTER R. PLUMMER
BY
ATTORNEY

Oct. 6, 1964   D. R. PLUMMER   3,151,486
ACCELEROMETERS
Filed July 17, 1961   4 Sheets-Sheet 3
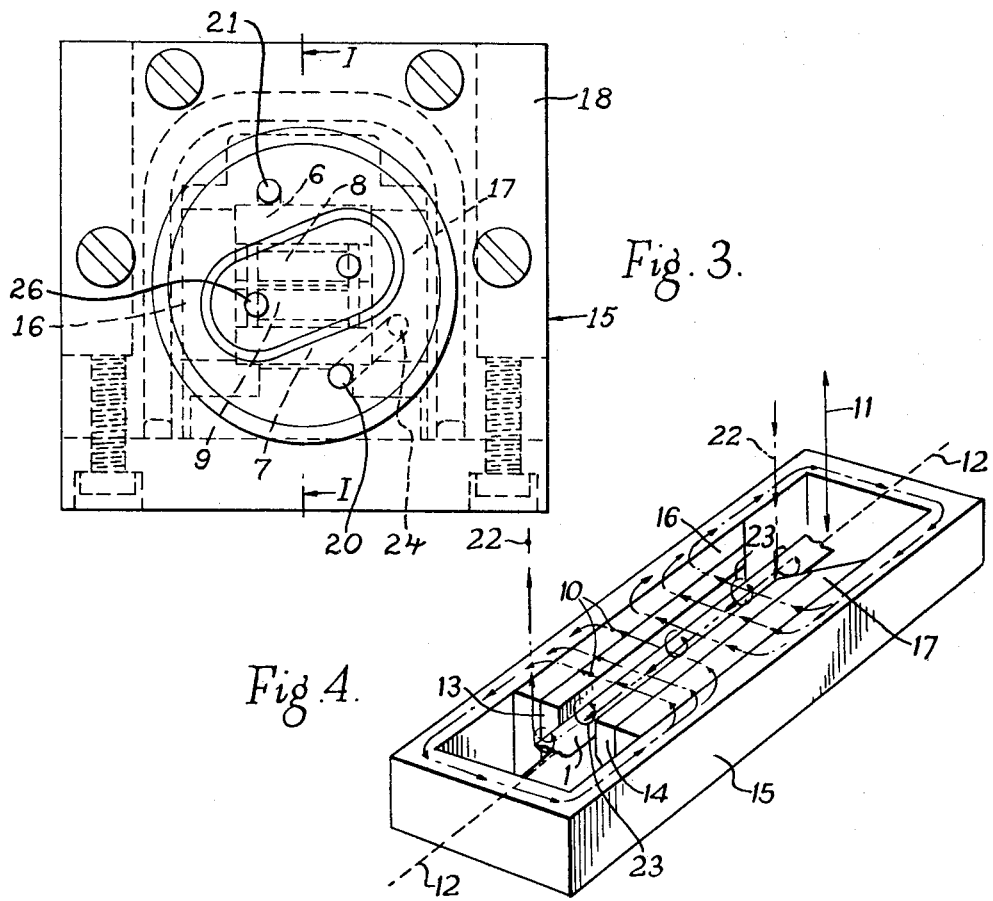
Fig. 3.
Fig. 4.
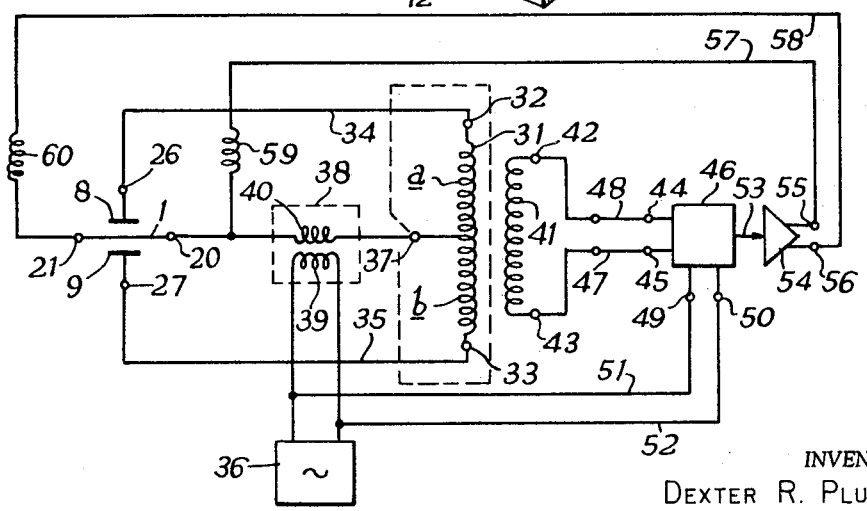
Fig. 5.
INVENTOR.
DEXTER R. PLUMMER
BY
ATTORNEY Oct. 6, 1964     D. R. PLUMMER     3,151,486
ACCELEROMETERS Filed July 17, 1961     4 Sheets-Sheet 4

INVENTOR.
DEXTER R. PLUMMER

United States Patent Office 3,151,486
Patented Oct. 6, 1964

3,151,486
ACCELEROMETERS
Dexter Robert Plummer, Bracknell, England, assignor to The Sperry Gyroscope Company Limited, Brentford, England, a company of Great Britain
Filed July 17, 1961, Ser. No. 124,687
Claims priority, application Great Britain July 27, 1960
8 Claims. (Cl. 73—517)

This invention relates to accelerometers and electric apparatus incorporating the same and seeks to provide an improved form thereof.

According to the invention there is provided an accelerometer in which the sensitive element comprises a relatively thin sheet of conductive material supported between two supports to be deflected transversely of the planes of its larger surfaces when subjected to acceleration forces, thereby to vary an electrical characteristic of the accelerometer.

The invention also provides an accelerometer comprising a sensitive element formed by a relatively thin sheet of conductive material supported between two supports to be deflectable transversely of the planes of its larger surfaces when subjected to acceleration forces, said surfaces each having a conductive electrode arranged adjacent it, the conductive electrodes and sensitive element forming a differential capacitor the capacitances of which are varied when the sensitive element is deflected.

Further the invention provides an accelerometer comprising a sensitive element formed by a relatively thin sheet of conductive material supported between two supports to be deflectable transversely of the planes of its larger surfaces when subjected to acceleration forces, two conductive electrodes on adjacent each of said larger surfaces and arranged to form with the sensitive element a differential capacitor the capacitances of which vary when the sensitive element is deflected, a magnet fixed relative to the supports for applying to said sensitive element over the major portion of its area a magnetic field and means for passing an electric current through the sensitive element to form a second magnetic field, the fields co-operative reaction between the fields exerting a force between the sensitive element and the magnet.

From another aspect the invention provides an electric apparatus including an accelerometer comprising detector means for detecting changes in the capacitance between the sensitive element and two conductive electrodes, one arranged adjacent each of its two larger surfaces.

From this other aspect the invention also provides an electric apparatus including an accelerometer comprising detector means for detecting changes in the capacitance between the sensitive element and two conductive electrodes, one arranged adjacent each of its two larger surfaces, and means responsive to said detector means for applying to the accelerometer an electric signal effective to maintain the sensitive element approximately in its rest position.

Further the invention provides, from this other aspect, an electric apparatus including an accelerometer comprising detector means for detecting changes in the capacitance between the sensitive element and two conductive electrodes, one arranged adjacent each of its two larger surfaces, and means for responding to said detector means for providing an electric signal the amplitude of which is dependent upon the change in capacitance, said signal being arranged to be applied to control a current through the sensitive element to produce an electromagnetic field co-operatively to react with an additional magnetic field applied to the sensitive element over a major portion of its area, thereby to maintain the sensitive element approximately in its rest position.

In order that the invention may be more readily understood some particular embodiments thereof will now be described, by way of example only, with reference to the accompanying drawings in which:

FIG. 3 is an end elevation of the accelerometer shown in FIGURE 1;

FIG. 4 is a perspective view of the accelerometer of FIGS. 1–3 showing the lines of the magnetic flux fields therein;

FIG. 5 is a schematic circuit diagram of an electric apparatus in accordance with the present invention and including an accelerometer of the kind shown in FIGS. 1–4;

Figure 1:
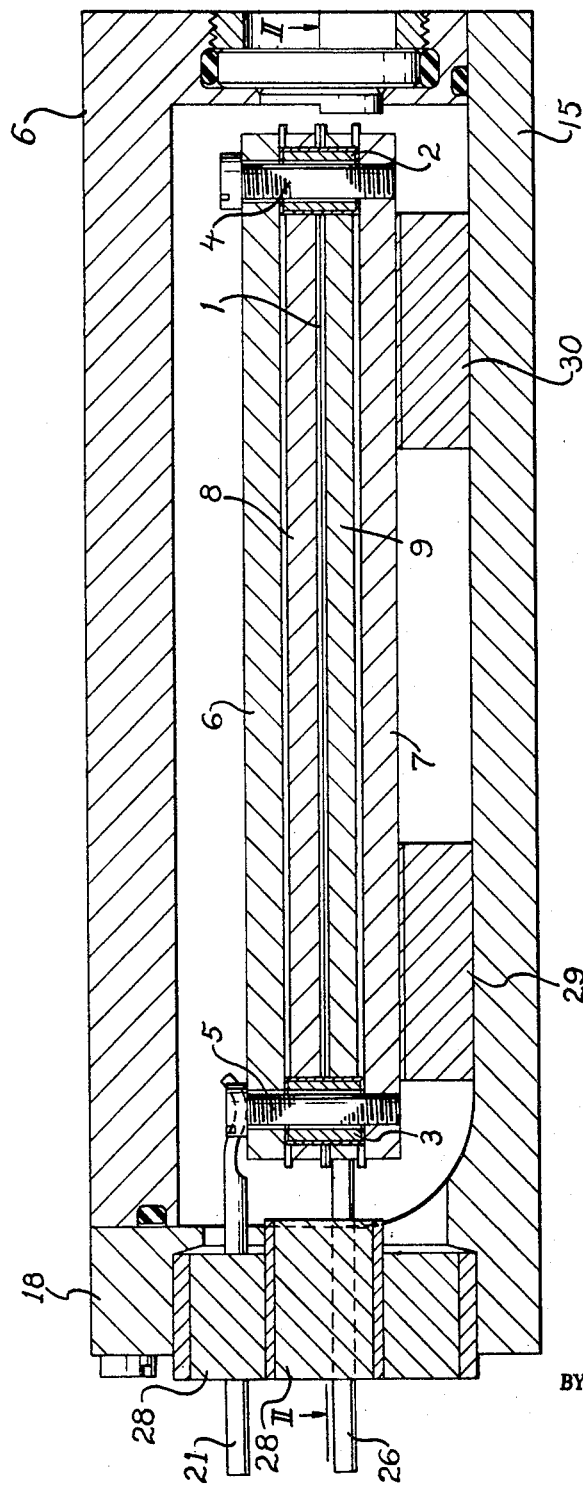
FIG. 1 is a side elevation of an accelerometer in accordance with the present invention.

Broadly, the accelerometer shown in FIGURES 1–4 of the accompanying drawings comprises a sensitive element in the form of a relatively thin sheet of conductive material, conveniently a ribbon. The ribbon is supported between two supports in such a manner that it is not appreciably slack, nor yet in appreciable tension. The ribbon is free to undergo deflection between the supports in a direction at right angles to its major surfaces by an amount which corresponds to the degree of acceleration to which it is subjected. The deflection is arranged to vary an electrical characteristic of the accelerometer to provide to associated apparatus an indication representing the acceleration. If desired the accelerometer may be of the force feedback kind, that is, one in which the displaceable element—in this case the ribbon—has applied to it a force approximately equal and opposite to that due to the acceleration forces, thereby to maintain it approximately in its normal, rest position. The force feedback may be applied either electromagnetically or electrostatically, for example in one of the ways later to be described.

In the accelerometers described below the electrical characteristics varied by deflection of the ribbon is the ratio of the capacitances formed between the sensitive element and two electrically conductive electrodes arranged one adjacent each of its larger surfaces.

In the accelerometers shown in FIGS. 1–4 the sensitive element is formed by an elongated gold ribbon 1 having an aperture near each end in each of which engages a cylindrical insulating member 2, 3. The members 2, 3 are maintained in position by bolts 4, 5 which form support members for the ribbon. The support bolts 4, 5 engage in two electrically conductive members 6, 7, the purpose of which will be explained later. The two conductive electrodes between the ribbon and which the capacitances vary when the accelerometer is subjected to acceleration forces are indicated at 8, 9 and are arranged one adjacent each of the two larger surfaces of the ribbon. The ribbon 1 has applied to it, over the greater portion of its length, a substantially constant magnetic field. These lines of flux 10 are, as shown in FIGURE 4, directed across the width of the ribbon 1, so that they are approximately at right angles both to the direction 11 in which the ribbon is moved by acceleration forces to which it is subjected and to the longitudinal axis 12 of the ribbon. This substantially constant magnetic field is produced by two opposed magnetic poles 13, 14 of opposite polarity, each extending along one of the two longitudinal edges of the ribbon 1. Conveniently the housing 15 of the accelerometer is of soft iron and of channel cross section to provide a magnetic path of low permeability between the pole pieces 13, 14 which are supported from the walls of the housing 15. The poles are energised by means of permanent magnets 16, 17 which serve also to support them away from the housing walls and adjacent the ribbon. Alternatively electro magnets may be employed. The channel from which the housing 15 is formed has its ends and open side closed by members 18, 19 of soft iron so that the whole housing assembly completely encloses and magnetically shields the ribbon 1 and the members 8, 9.

The members 6, 7 referred to above form screening electrodes for the members 8, 9 respectively. The screening electrodes extend around three sides of the members 8, 9 as shown more clearly in FIGURE 3. The screening electrodes 6, 7 form, effectively, two elongated channels extending along the length of the members 8, 9 so that each lies within the channel formed by its associated screening electrode.

Two terminals 20, 21 are provided by which an electric connection can be made to each end of the ribbon 1 whereby a direct current signal, 22 in FIGURE 4, may be passed through the ribbon in an appropriate sense to create a magnetic field having flux lines 23 which co-operatively react with the flux lines 10 to provide a displacement force on the ribbon 1 relative to its supports 4, 5, to maintain it approximately in its normal position. The terminal 20 is connected directly to the ribbon 1 near one of its ends by the connection 24 shown in FIG. 2 while the terminal 21 is in engagement with the screening electrode 6 through which the return connection is made from the ribbon 1 by way of the conductive tab 25 near the other end of said ribbon. The members 8, 9 are also connected to corresponding terminals 26, 27 which, like the terminals 20, 21, are supported in the housing end member 18 by insulated bushes 28. The whole assembly of ribbon 1, conductive members 8, 9 and screening electrodes 6, 7 are supported from the housing 15 by supports 29, 30.

The change in the ratio of the capacitances formed between the ribbon 1 and the two electrically conductive members 8, 9 when the accelerometer is subjected to acceleration forces is determined by connecting them in a high frequency bridge circuit arrangement as shown in FIG. 5 so that the two capacitances formed between each member and the ribbon form a conjugate pair of arms of approximately equal impedances in the absence of acceleration forces. The remaining arms of the bridge are formed by the two sections $a$, $b$ of a centre tapped primary winding 31 of a high-frequency transformer, the end terminals 32, 33 of which are connected directly through conductors 34, 35 to the terminals 26, 27 and thence to the members 8, 9. The bridge arrangement thus formed is supplied with high-frequency current by connecting the high-frequency current source 36 between one of the ribbon terminals 20 and the centre tap terminal 37 of the transformer primary winding 31. The connection between the high-frequency current source 36 and the terminals 20 and 37 is made through a high-frequency transformer 38, having its primary winding 39 connected to said high-frequency current source 36 and its secondary winding 40 between said terminals 20, 37. An output signal is derived from the bridge circuit arrangement by a secondary winding 41 associated with the winding 31 and symmetrically coupled to the two halves $a$ and $b$ of that winding. Deflections of the ribbon cause the bridge to become unbalanced and result in an output signal being developed between the terminals 42, 43 of the secondary winding 41. The amplitude of the output signal is dependent upon the degree of deflection of the ribbon 1 while the phase of the signal represents the sense of this displacement. The output signal is passed from the terminals 42, 43 to the input terminals 44, 45 of a phase discriminator 46 by way of conductors 47, 48. The phase discriminator 46 compares the phase of the output signal from terminals 42, 43 with that of a reference signal applied between terminals 49, 50 and obtained from the high-frequency current source 36 over conductors 51, 52. The output signal from the phase discriminator is a direct current signal having an amplitude and polarity dependent upon the degree and sense of the displacement of the ribbon.

This signal is passed, over signal path 53 to an amplifier 54 which amplifies the signal to provide at its output terminals 55, 56 a force feedback signal for application through the conductors 57, 58 to the terminals 20, 21 of the ribbon 1. The current due to this signal produces a magnetic field about the ribbon 1 which co-operatively reacts with the field produced by the magnet poles 13, 14 to provide a displacement force on the ribbon to maintain it approximately in its normal position. To minimize unnecessary radiation and coupling of the high-frequency currents from the source 36 high-frequency chokes 59, 60 are provided in the conductors 57, 58 near the terminals 20, 21. These chokes 59, 60 have an impedance which is relatively high to said high-frequency currents but relatively low to the signals from the amplifier 54.

The screening provided by the screening electrodes 6, 7 may be maintained by connecting the members 8, 9 to the primary winding 31 of the high frequency transformer through a screened or coaxial cable. The primary winding 31 may itself be enclosed by an open circuit electrostatic screen 61 connected to the centre tap terminal 37. The screening conductor of each cable is also connected at one end to the terminal 37 and at the other to the screening electrode 6 or 7 associated with that one of the members 8 or 9 to which the inner conductor of the cable is connected. Thus, the four arms of the high-frequency bridge circuit arrangement formed by the two halves $a$ and $b$ of the primary winding of the high-frequency transformer and the differential capacitor formed by the ribbon 1 and the electrodes 9, 10 are almost completely enclosed in a single screening enclosure connected to the centre tap terminal 37 of the transformer primary winding 31. For clarity, some of these screening arrangements are omitted from the drawings.

Figure 6:
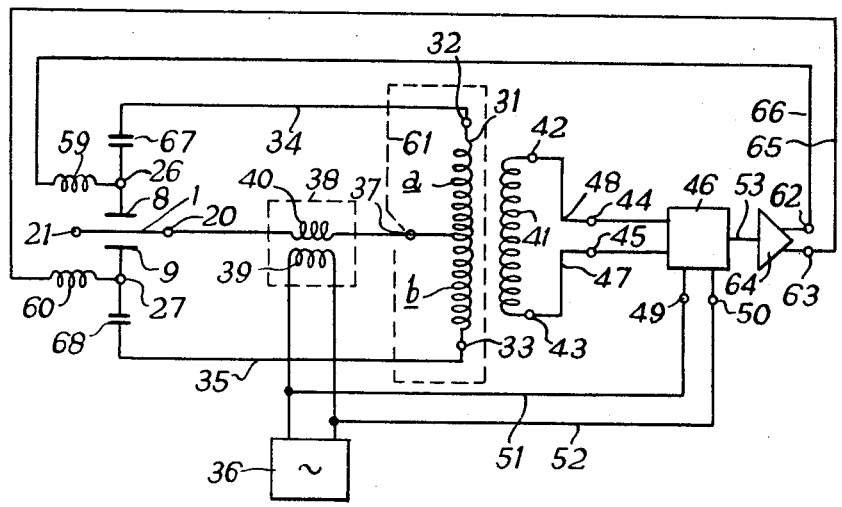
FIG. 6 is a schematic circuit diagram of another electric apparatus in accordance with the present invention and including a modified form of accelerometer in accordance with the present invention.

In the circuit arrangement shown in FIG. 6 the accelerometer is modified so that the feedback force on the sensitive element is applied electrostatically. Those components which are similar to those used in the arrangement of FIGURE 5 have the same reference numerals. In such an arrangement the electrodes 8, 9 are used to apply the feedback forces. For this purpose controlled direct current potentials from the output terminals 62, 63 of the amplifier 64 are applied over conductors 65, 66 to the electrodes 8, 9, these potentials being superimposed on the high-frequency potentials from the source 36 applied to excite the high-frequency bridge circuit arrangement associated with the accelerometer. To prevent the winding 31 acting as a shunt-circuit between the amplifier output terminals 61, 62 each of the conductors 34, 35 includes in series between it and the terminals 26, 27 a blocking capacitor 67, 68 respectively.

In this modified form of the invention it is an advantage to make the ribbon relatively wide. This is made possible by the omission of the magnetic poles 13, 14 and permanent magnets 16, 17 since they are then not required in this modified accelerometer. By making the ribbon relatively wide the ratio between the feedback and acceleration force is unaffected but the magnitude of the capacity change brought about by acceleration deflections is increased; consequently the ratio of the pick-off signals to noise is increased. In addition damping forces due to motion of the air displaced by the ribbon when it moves are greatly increased in the case of a wider ribbon. However, with electrostatic force feedback the range of accelerations over which the accelerometer is effective is reduced as compared with that of the previously described embodiment since electrostatic forces are relatively weak unless very high potentials are used, and the potentials which can be used in practice are limited by the problem of insulation breakdown in various parts of the accelerometer. An improvement in this respect can be obtained by enclosing the ribbon 1 and electrodes 8, 9 in a vacuum envelope. However, for the measurement of low values of acceleration the electrostatic force feedback embodiment of the invention has some advantage; for example, the relatively large soft iron housing 15 and the permanent magnets may be eliminated altogether, thereby making the accelerometer both lighter and smaller. Furthermore, it is possible that the basic stability of the accelerometer could be increased since random variations in the flux density of the magnetic field of the permanent magnets would no longer be a factor affecting its operation.

Figure 7:
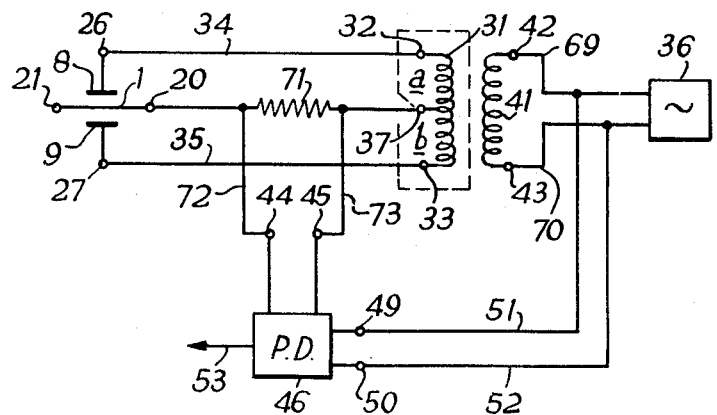
FIG. 7 is a schematic circuit diagram of a modified arrangement of the circuit diagrams of FIGURES 6 and 7.

If desired both the bridge circuit arrangements of FIGS. 5 and 6 may be modified slightly to that shown in FIG. 7. Here the input and output terminals of the bridge are effectively interchanged. In this modified arrangement the terminals 42, 43 of the secondary winding 41 of the high-frequency transformer is connected by conductors 69, 70 to the high-frequency current source 36. An impedance 71, such for example as a resistor, is connected between the terminal 20 of the ribbon 1 and the centre tap terminal 37 of the primary winding 31 so that the potential difference is generated across its ends when the bridge is unbalanced. This potential difference forms the output signal of the accelerometer and is applied to the input terminals 44, 45 of the phase discriminator 46 by conductors 72, 73. The screening arrangements may be as previously described.

Figure 2:
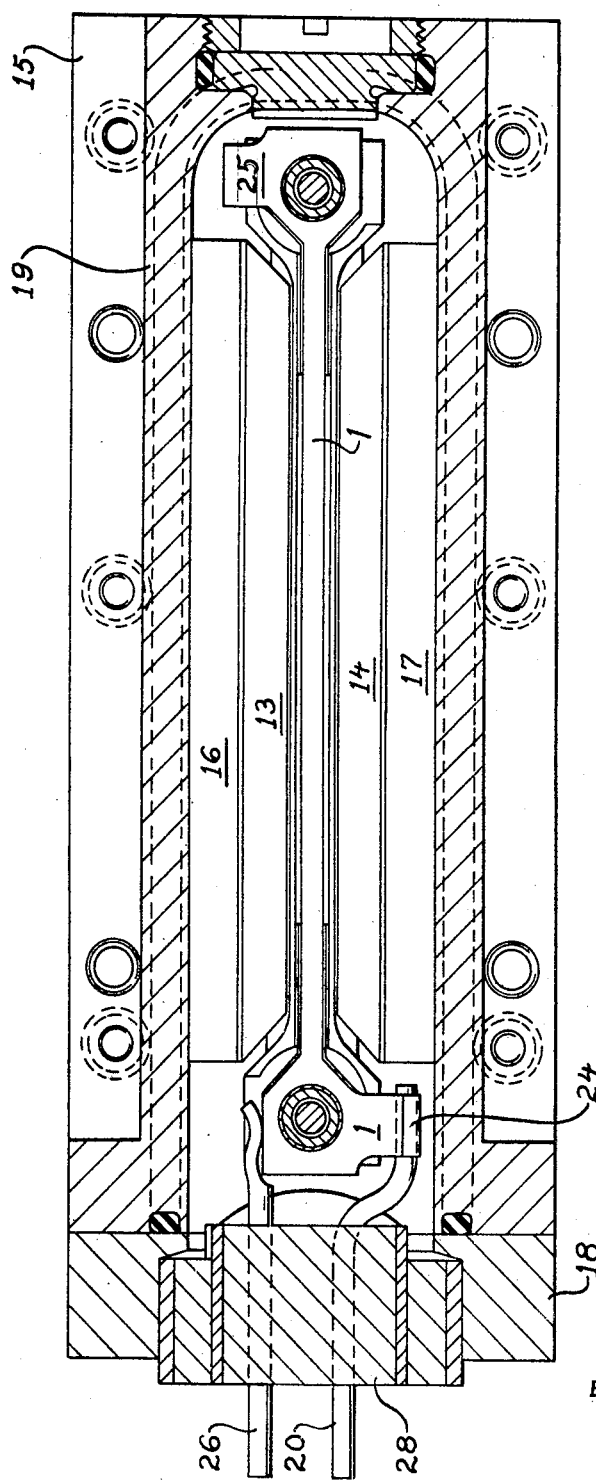
FIG. 2 is a sectional view taken on line 11—11 of FIGURE 1.

An accelerometer of the kind described in connection with FIGS. 1-3 has the advantage that the feedback force is derived from a current carried by the ribbon itself. This obviates a separate coil, the turns of which would need to be insulated from each other and usually, to be supported on, for example, a former associated with the sensitive element. The consequent loading of the sensitive element with the mass of the coil and its associated parts is thus avoided. In the accelerometer of the present invention the formation of the sensitive element as a sheet or ribbon enables high currents safely to be passed through it due to its large surface area in relation to its volume. These large currents allow correspondingly large feedback forces to be applied to the ribbon, so that the accelerometer is usable for measuring high rates of acceleration. A further factor contributing to the same result is that with the sensitive element in the form of a ribbon it is possible to produce a magnetic field of very high flux density in the area in which the ribbon is located. An additional advantage of the accelerometer of the present invention is that the ribbon forming the sensitive element is very stable, since it is of uniform material which furthermore may be of high inherent stability, such for example as gold. The stability is further improved since the ribbon is not associated with other metals, hygroscopic resins, and the like. The number of parts which need to be accurately dimensioned is small and this helps lower the cost of manufacture.

While in the embodiments described above the ribbon is described as being so arranged that it does not hang loose nor yet is under any appreciable tension, it will be appreciated that such a state of affairs, is difficult to achieve in practice. It may therefore be desirable in some circumstances to arrange that the ribbon is naturally slack and to apply to it a biasing force initially to deflect the ribbon in one direction. This biassing force will produce a small tension in the ribbon, but the magnitude of this tension will be a known quantity which can be taken into account when the accelerometer is used. Such biassing of the ribbon may be effected by arranging the output signal of the amplifier to have a finite value when the ribbon is not subject to any acceleration force. Alternatively in the arrangement of FIG. 5 the biassing of the ribbon may be effected electrostatically by applying suitable potentials to the ribbon 1 and the electrodes 8, 9 in a manner similar to that described in connection with FIGURE 6.

What is claimed is:
1. In an acceleration sensitive device,
   (1) first and second support means,
   (2) an acceleration sensitive element comprising a relatively thin narrow sheet of conductive material supported between said first and second support means for deflection transversely of the planes of its larger surfaces when subject to acceleration forces,
   (3) a source of electrical energy,
   (4) a pair of conductive electrodes,
   (5) said larger surfaces each having one of said conductive electrodes arranged adjacent to it whereby the conductive electrodes, sensitive element and electrical energy source form a differential capacitor the capacitances of which are varied when the sensitive element is deflected,
   (6) means including electrical means cooperative with said sensitive element for applying a signal representative of the displacement of said sensitive element to tend to maintain said sensitive element in a predetermined position wherein sand means including electrical means includes a magnet for applying to said sensitive element over the major portion of its area a magnetic field and further includes means responsive to the displacement of said sensitive element for passing an electric current representative of said displacement through the sensitive element to form a second magnetic field whereby the cooperative reaction between said fields exerts a force on said sensitive element tending to maintain the sensitive element in said predetermined position.

2. In an acceleration sensitive device,
   (1) first and second support means,
   (2) an acceleration sensitive element comprising a relatively thin narrow sheet of conductive material supported between said first and second support means for deflection transversely of the planes of its larger surfaces when subjected to acceleration forces,
   (3) a source of electrical energy,
   (4) a pair of conductive electrodes,
   (5) said larger surfaces each having one of said conductive electrodes arranged adjacent to it whereby the conductive electrodes, sensitive element and electrical energy source form a differential capacitor the capacitances of which are varied when the sensitive element is deflected,
   (6) a magnet fixed relative to said supports for applying to said sensitive element over a major portion of its area a first magnetic field, and
   (7) means responsive to the displacement of said sensitive element for passing an electric current representative of said displacement through said sensitive element to form a second magnetic field whereby said first and second fields cooperate to exert a force between said sensitive element and said magnet.

3. In an acceleration sensitive device as described in claim 2 wherein said sensitive element is in the form of an elongated metal ribbon.

4. In an acceleration sensitive device as described in claim 2 wherein said conductive electrodes having associated with them screening members formed of channel cross sections and said conductive electrodes are arranged to lie within said channels and to be closely separated therefrom whereby each screening electrode extends around the greater part of the circumference of its associated conductive electrode over the greater portion of its length.

5. In an acceleration sensitive device as described in claim 2 wherein said magnet is arranged to create a magnetic field having its lines of flux directed across the width of the sensitive element over the major portion of its length and said lines of flux are approximately at right angles both to the direction of movement of the sensitive element when subjected to acceleration forces and to its longitudinal axis.

6. In an acceleration sensitive device as described in claim 2 wherein said magnet provides two opposed poles of opposite polarity each extending along one of the two longitudinal edges of the sensitive element and a path of low magnetic reluctance is provided between the two opposed magnet poles thereby to form a magnetically permeable loop which includes the sensitive element and the air gaps between said sensitive element and said two opposed magnet poles.

7. In an acceleration sensitive device as described in claim 6 wherein the path of low magnetic reluctance is provided by a housing from which the sensitive element and magnetic poles are supported whereby the housing substantially encloses and magnetically shields the sensitive element and the two conductive electrodes.

8. An acceleration sensitive device comprising,
  (1) first and second support means,
  (2) an acceleration sensitive element comprising a relatively thin narrow sheet of conductive material supported between said first and second support means for deflection transversely of the planes of its larger surfaces when subjected to acceleration forces,
  (3) a source of electrical energy,
  (4) a pair of conductive electrodes,
  (5) said larger surfaces each having one of said conductive electrodes arranged adjacent to it whereby the conductive electrodes, sensitive element, and electrical energy source form a differential capacitor the capacitances of which are varied when the sensitive element is deflected,
  (6) detector means for detecting changes in the capacitance of said two conductive electrodes,
  (7) means responsive to said detector means for applying to said device an electrical signal effective to tend to maintain said sensitive element in a predetermined position,
  (8) means for providing a first magnetic field to the sensitive element over a major portion of its area, and
  (9) means responsive to said detector means for providing an electrical signal the amplitude of which is dependent upon the change in capacitance wherein said signal is applied to control the current through said sensitive element to produce a second electromagnetic field that reacts cooperatively when said first magnetic field to tend to maintain said sensitive element in said predetermined position.

References Cited in the file of this patent

UNITED STATES PATENTS

| | | |
|---|---|---|
| 2,316,915 | Truman | Apr. 20, 1943 |
| 2,377,869 | Elliott | June 12, 1945 |
| 2,552,650 | Rawlings | May 15, 1951 |
| 2,643,869 | Clark | June 30, 1953 |
| 2,697,594 | Stanton | Dec. 21, 1954 |
| 2,869,851 | Sedgfield | Jan. 20, 1959 |
| 2,946,226 | Wendt | July 26, 1960 |
| 2,968,952 | Stalder | Jan. 24, 1961 |
| 3,003,356 | Nordsieck | Oct. 10, 1961 |

FOREIGN PATENTS

| | | |
|---|---|---|
| 522,411 | Italy | Apr. 7, 1955 |
| 763,225 | Great Britain | Dec. 12, 1956 |
| 1,062,965 | Germany | Aug. 6, 1959 |